United States Patent
Samprathi et al.

(10) Patent No.: US 7,802,296 B2
(45) Date of Patent: Sep. 21, 2010

(54) METHOD AND SYSTEM FOR IDENTIFYING AND PROCESSING SECURE DATA FRAMES

(75) Inventors: Ravikanth Venkata Samprathi, Santa Clara, CA (US); Rodney Fong, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 1064 days.

(21) Appl. No.: 11/509,148

(22) Filed: Aug. 23, 2006

(65) Prior Publication Data

US 2008/0052773 A1 Feb. 28, 2008

(51) Int. Cl.
*G06F 15/16* (2006.01)
(52) U.S. Cl. .......................................... 726/13
(58) Field of Classification Search ................ None
See application file for complete search history.

(56) References Cited

U.S. PATENT DOCUMENTS

| | | | | |
|---|---|---|---|---|
| 5,983,270 A | * | 11/1999 | Abraham et al. | 709/224 |
| 6,158,008 A | * | 12/2000 | Maria et al. | 726/13 |
| 7,130,308 B2 | * | 10/2006 | Haddock et al. | 370/423 |
| 7,471,690 B2 | * | 12/2008 | Asano et al. | 370/401 |
| 7,516,487 B1 | * | 4/2009 | Szeto et al. | 726/22 |
| 2003/0208571 A1 | * | 11/2003 | Yik et al. | 709/223 |

OTHER PUBLICATIONS

John W. Lockwood, Evolvable Internet Hardware Platforms, Department of Computer Science Applied Research Lab, Washington University, Saint Louis, IEEE, 2001.

* cited by examiner

*Primary Examiner*—Matthew B Smithers
*Assistant Examiner*—David J Pearson
(74) *Attorney, Agent, or Firm*—Trellis IP Law Group, PC

(57) ABSTRACT

A method and system has been provided for identifying and processing secure data frames flowing between a source port and a switch port in a network. A data frame from the source port is received at the switch port. The network address of the source port is detected from the data frame. An entry corresponding to the network address of the source port is searched for in a forwarding table. The data frame is identified as a secure or a non-secure data frame on the basis of the entry in the forwarding table. Non-secure data frames are redirected and processed.

19 Claims, 8 Drawing Sheets

METHOD AND SYSTEM FOR IDENTIFYING AND PROCESSING SECURE DATA FRAMES

BACKGROUND OF THE INVENTION

1. Field of Invention

Embodiments of the invention relate, in general, to network security. More specifically, the embodiments of the invention relate to a method and a system for identifying and processing a secure flow of data in a network.

2. Description of the Background Art

In a typical network, sensitive information is exchanged between various network devices. Sensitive information is privileged and confidential information such as information related to user identification, business details, design sketches, and so forth. This sensitive information has to be protected from hacking, intrusion, and attempts to disrupt, harm, or disable computer systems in the network. Various techniques are used to prevent hacking and other intrusions. These techniques may be categorized as risk-avoidance systems or risk management systems.

Risk-avoidance systems mitigate the risk of hacking, intrusion and so forth, by introducing a barrier to unauthorized entry of any kind into a network. Conventionally, risk-avoidance systems include, but are not limited to, network firewalls and data encryption. Firewalls are software or hardware devices that filter users allowing access only to the authorized users in the network. Commercial examples of firewalls available in the market include, Firewall-1™, Guardian™, BorderWare™, among others. However, network firewalls restrict access to a limited number of users in the network. Data encryption involves changing information into an unreadable form by mixing bits of data with a password key. This makes the data unreadable unless decrypted by an intruder. Although data encryption is an effective security mechanism, the encryption algorithms require high processing capacity and can be broken through over a period of time.

Risk management systems can detect any malicious activity in the network. Conventionally, risk management systems are software systems that involve network intrusion-detecting applications. These intrusion-detecting applications raise an alarm and provide system administrators details about the network intrusions. Commercial examples of risk management systems available in the market include ISS RealSecure™, NetRanger™ and others. However, the network intrusion-detecting applications sometimes generate false alarms, and at other times fail to prevent intrusions.

There exist other techniques that provide physical security by implementing port-based access control mechanism in those networks where sensitive information is exchanged through secure channels. Ports are access points that connect network devices to the network. Conventional systems that provide physical security involve software features such as port security, identification and processing of the flow of data across the secure channel. However, software-based port-security features sometimes allow non-secure flows to be forwarded on to the secure ports. Moreover, secure traffic leaks out to non-secure ports at times. As a result, frame-level security may not be attainable by using only software-based intrusion identification and processing.

DETAILED DESCRIPTION OF EMBODIMENTS OF THE INVENTION

Embodiments of the invention provide a method, and a system for identifying and processing the secure data frames in a network. In the description herein for embodiments of the invention, numerous specific details are provided, such as examples of components and/or methods that provide a thorough understanding of embodiments of the invention. One skilled in the relevant art will recognize, however, that an embodiment of the invention can be practiced without one or more of the specific details, or with other apparatuses, systems, assemblies, methods, components, materials, parts, and so forth. In other instances, well-known structures, materials, or operations are not specifically shown or described in detail to avoid obscuring aspects of embodiments of the invention.

Embodiments of the invention provide a method and a system for identifying and processing secure data frames in a network. The data frames flow from a source port to a switch port. Ports are access points that connect network devices to the network. Source port can be a Point of Sale (PoS), an Ethernet port of a client, a smart card reader, and so forth. At the switch port, a network address of the source port is identified. Thereafter, an entry corresponding to the network address is searched for in a forwarding table at the switch. The forwarding table is a table that includes information about the source and the destination of the data frame. At the switch, the data frame is identified as a secure or a non-secure data frame, based on the entry in the forwarding table. The data frame is identified as a secure data frame if the entry is marked as secure. In case the entry is not marked as secure in the forwarding table, the data frame is identified as a non-secure data frame. Subsequently, the non-secure data frame is redirected to a notification port or a receiving port on the switch, based on a notifying bit in the entry in the forwarding table. At the notification port, an application in the network is notified about the non-secure data frame. Thereafter, the non-secure frame is dropped. At the receiving port, the non-secure data frame is examined, based on a predefined condition to determine whether the data frame is secure or not. After the examination, if the data frame is found to be secure, then the forwarding table is updated and the network address of the source of data frame is identified as secure. This allows other data frames from the new source port on this flow to be forwarded and not dropped. However, if the data frame is found to be non-secure after the examination, then the application is notified and the non-secure frame is dropped.

Figure 1:
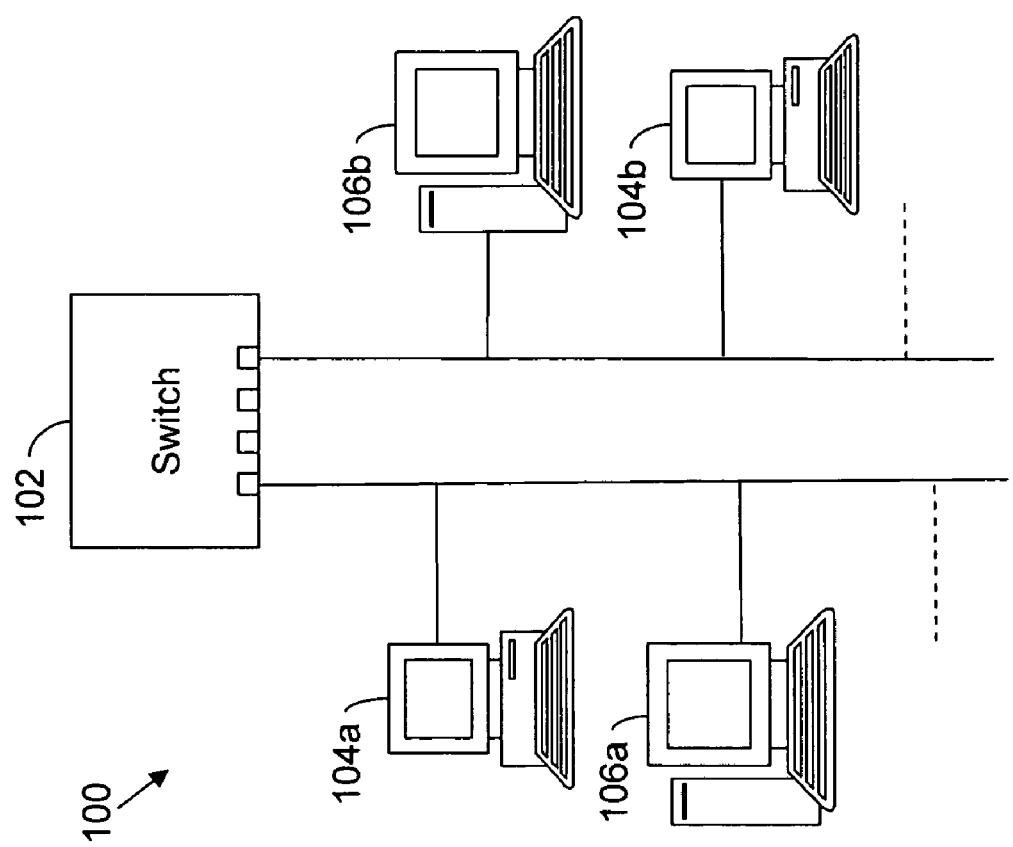
FIG. 1 illustrates an exemplary environment, wherein embodiments of the invention can be practiced.

Referring now to the drawings, particularly by their reference numbers, FIG. 1 illustrates an exemplary environment 100, wherein the embodiments of the invention can be practiced. Environment 100 includes a network device such as switch 102, secure hosts 104a and 104b, and non-secure hosts 106a and 106b. Any number of hosts may be coupled to switch 102 and in other embodiments, the number of secure and non-secure hosts can vary. Switch 102 is a network device capable of inspecting data frames as they are received, determining the source and the destination of the data frames, and directing the data frames to the destinations in the network. The source and the destination are determined by identifying network addresses of the network devices sending the data frames. The network addresses can be Media Access Control (MAC) address, Virtual Local Area Network (VLAN) address, Internet Protocol (IP) address, and so forth.

The association between the source, the destination, and the switch is maintained as entries in a forwarding table. Switch 102 determines the network addresses of the source and the destination. Thereafter, the network addresses are searched for in the forwarding table. The data frames are sent to the port of switch 102 connected to the destination. This has been illustrated in conjunction with FIG. 3. In case the network address of the source is not found in the forwarding table, the switch redirects the data frame to a notification port or a receiving port for further examination and processing. Generally, devices, communication links, protocols, data definitions and other characteristics may vary from those illustrated herein. For example, switch 102 can be a network device such as a network switch, a hub, a router, and so forth. Switch 102 is connected to secure hosts 104a and 104b, and non-secure hosts 106a and 106b using transmission cables.

Secure hosts 104a and 104b are network devices that receive, store and transmit sensitive data in the network. The sensitive data includes confidential military data, credit card information, passwords, user identifications, key personal data, enterprise data, and so forth.

Non-secure hosts 106a and 106b are network devices that receive, store, and transmit public data in the network. Public data includes information that is available to all users in the network. If sensitive information is present on non-secure hosts 106a and 106b, the sensitive information can be accessed by unauthorized users. Non-secure hosts 106a and 106b may also attempt to hack, harm or disable secure hosts 104a and 104b. Moreover, non-secure hosts 106a and 106b may attempt to send public data to secure hosts 104a and 104b.

Examples of hacking and intrusion include network address spoofing, session hijacking, server spoofing, Domain Name Service (DNS) poisoning, password cracking, and so forth. Examples of harming or disabling the network and/or secure hosts 104a and 104b include Denial of Service (DoS) attacks such as ping broadcast, ping of death, smurf, teardrop, and so forth. Other techniques of harming or disabling secure hosts 104a and 104b include sending Trojan horses, logic bombs, worms, viruses, and so forth. Most of these attacks include sending malicious or non-secure data frames to secure hosts 104a and 104b. The prevention of these attacks requires identifying and processing secure data frames.

Figure 2:
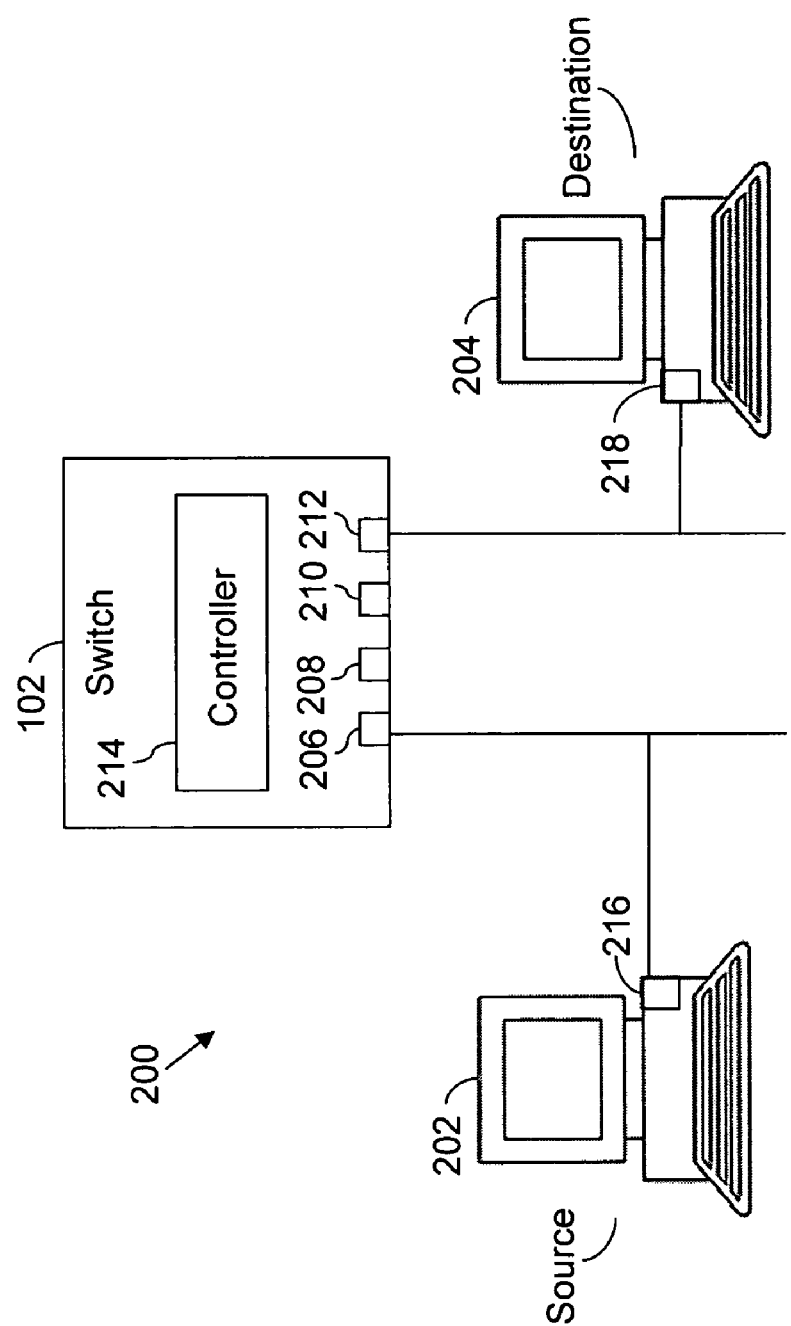
FIG. 2 is a block diagram of a system that processes data frames in a network in accordance with an embodiment of the invention.

FIG. 2 is a block diagram of a system 200 that processes data frames in a network, in accordance with an embodiment of the invention. System 200 includes switch 102, source 202 and destination 204. Switch 102 includes switch ports 206, 208, 210, and 212, and controller 214. Source 202 includes source port 216. Destination 204 includes destination port 218.

Source port 216 is connected to switch port 206. Switch 102 forwards the data frames received from source port 216. Thereafter, controller 214 categorizes the data frame as a secure data frame or a non-secure data frame, based on the network address of source port 216. As a result of the categorization, source 202 is categorized as a secure or a non-secure host.

The data frame includes VLAN information, destination network address and source network address. Controller 214 identifies the network address of source port 216 from the data frame. Various standards that govern the constitution of the data frame are IEEE 802.1x, IEEE 802.1q, IEEE 802.3, CDP, SNAP, and so forth.

Network address of source port 216 is then searched for in the forwarding table at switch 102. The forwarding table includes the switch-port index, network address of the source and destination port, VLAN address, and any other information.

In an embodiment of the invention, controller 214 includes the forwarding table. The forwarding table is an L2 forwarding table. Controller 214 searches for an entry corresponding to the network address of host 202 in the forwarding table. Thereafter, controller 214 classifies the data frame as secure on the basis of a secure bit in the entry corresponding to the network address of host 202.

In an embodiment of the invention, the data frame is classified as a secure data frame if the value of the secure bit is set to '1' in the entry. Entries corresponding to secure hosts 104a and 104b have the secure bit set to '1' in the forwarding table. The data frame is classified as non-secure if the secure bit is set to '0' in the entry. In case the network address of source port 216 is not found in the forwarding table, the secure bit is set to '0' and the data frame is classified as non-secure. Further, a notifying bit in the entry is set to '0' and the network address of source port 216 is entered in the forwarding table. Thereafter, the non-secure data frame is redirected to a notification port or a receiving port of switch 102 for further processing and examination. Correspondingly, the source is classified as a secure or non-secure host.

In an embodiment of the invention, the entry in the forwarding table, with the secure bit set to '1', is locked. This prevents any alteration in the connection between switch port 206 and source port 216. Thereafter, non-secure hosts 106a and 106b would not be able to leak out any sensitive information by changing entries in the forwarding table.

Figure 3:
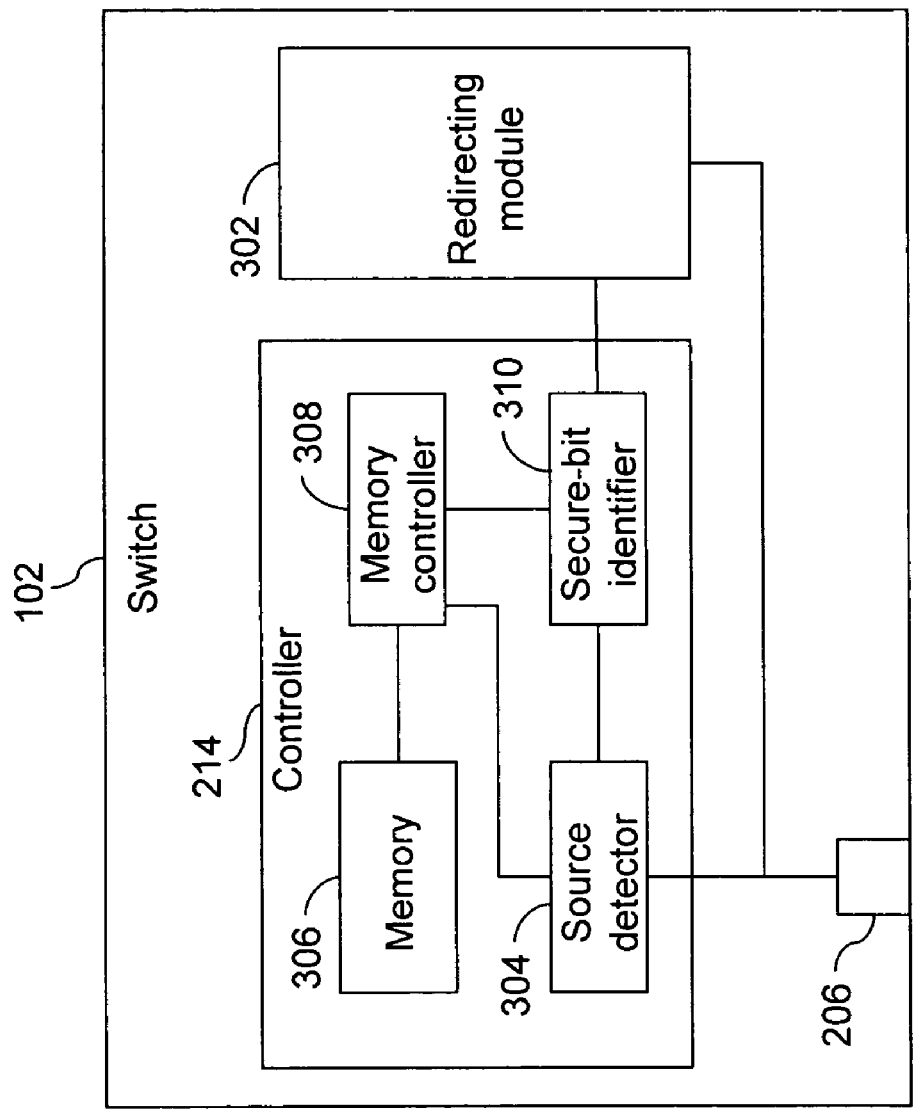
FIG. 3 illustrates various components of a switch that processes data frames in accordance with an embodiment of the invention.

FIG. 3 illustrates various components of switch 102 that process data frames, in accordance with an embodiment of the invention. Switch 102 includes switch port 206, controller 214, and redirecting module 302. Controller 214 further includes source-detector 304, memory 306, memory controller 308, and secure-bit identifier 310.

As mentioned earlier, switch port 206 receives data frames from network devices in the network. Source-detector 304 identifies the network address of source port 216, which sends the data frame. In an embodiment, source-detector 304 includes a bitmask that extracts the network address of source port 216 from the data frame. Thereafter, the network address of source port is searched for in the forwarding table. The forwarding table is stored in memory 306. Memory 306 is a Content Addressable Memory (CAM). CAM is the hardware component of memory and data is pre-loaded into it. Examples of CAM include binary CAM and ternary CAM, etc.

The memory is searched using memory controller 308. For example, the data being searched is the network address of source port 216 or destination port 218. Each forwarding table entry is stored at a location in the CAM.

Memory 306 is controlled and configured by memory controller 308. Memory controller 308 receives the network address of source port 216 and searches for the network address in memory 306. Thereafter, memory 306 provides memory locations containing the forwarding table entries corresponding to the network addresses to memory controller 308. Secure-bit identifier 310 linked to memory controller 308 reads secure bit in the forwarding table entries. Secure-bit identifier 310 categorizes the data frame received from source port 216 as secure or non-secure, based on the value of the secure bit. Thereafter, secure-bit identifier 310 directs the non-secure data frame to redirecting module 302. Redirecting module 302 directs the non-secure data frame to other ports on switch 102 where the data frame is dropped or examined, based on pre-defined conditions that may vary from implementation to implementation and are not otherwise described. Redirecting module 302 is described in detail in conjunction with FIG. 4.

Figure 4:
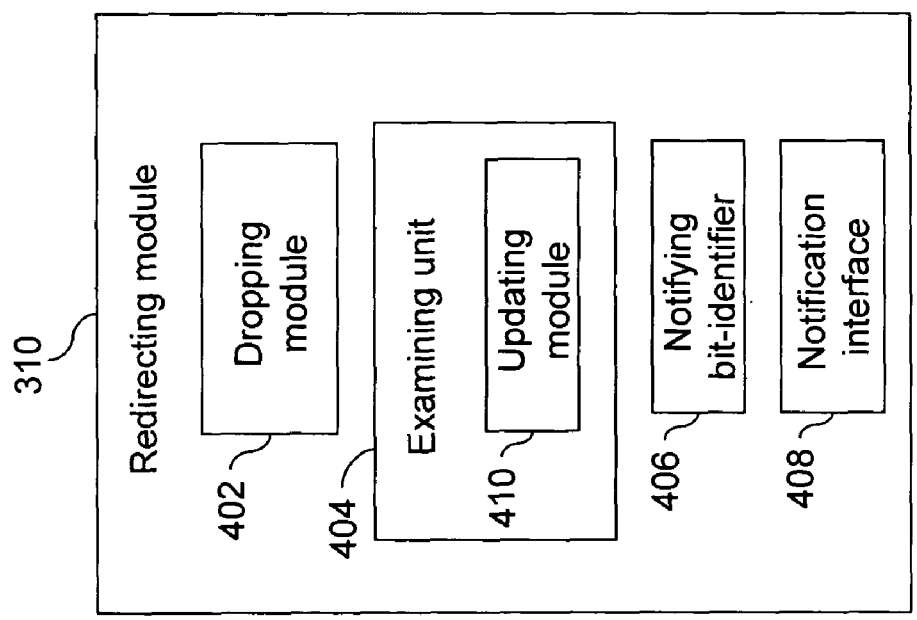
FIG. 4 is a block diagram of a redirecting module that processes data frames in a network in accordance with an embodiment of the invention.

FIG. 4 is a block diagram of redirecting module 302 that processes a data frame in the network, in accordance with an embodiment of the invention. Redirecting module 302 includes a dropping module 402, an examining unit 404, a notifying-bit identifier 406, and a notification interface 408. A non-secure data frame is sent to redirecting module 302 by secure-bit identifier 308. Thereafter, the non-secure data frame is forwarded to notifying-bit identifier 406.

If the value of the notifying bit is '1', redirecting module 302 directs the non-secure data frame to a register. The register is hereinafter referred to as 'RED_NOTIFY_SEC'. The RED_NOTIFY_SEC register directs the non-secure data frame to a notification port. Notification interface 408 notifies an application in the network, which acts as an security administrator, about the non-secure data frame. In an embodiment of the invention, the application is a software system that automatically resolves security breaches at redirecting module 302. Thereafter, the non-secure data frame is dropped at dropping module 402.

However, when the value of notifying bit is identified as '0' at notifying-bit identifier 406, the redirecting module 302 directs the non-secure data frame to a different register. The register is henceforth referred to as 'RED_SEC_MOVE'. The RED_SEC_MOVE register directs the non-secure data frame to a receiving port at switch 102. Thereafter, examining unit 404 analyzes the non-secure data frame at the redirected port. Examining unit 404 includes an updating module 410. The non-secure data frame is analyzed at updating module 410 that detects the destination network address and other features such as the data frame protocol of the non-secure data frame. Based on the analysis, the non-secure data frame can be identified as a secure data frame. 1321 In an embodiment of the invention, a software-based program is employed to analyze the non-secure data frame. In another embodiment of the invention, the system administrator analyzes the non-secure data frame. When the non-secure data frame is identified as secure, the entry in the forwarding table corresponding to the non-secure data frame is updated. The updating includes setting the value of the secure bit to '1'. However, if the non-secure data frame is found to be non-secure, the value of the notifying bit is set to '0' and the non-secure data frame is dropped at dropping module 402.

Secure-bit identifier 310, notifying-bit identifier 406, updating module 410 and dropping module 402 altogether implement a Drop on Source Miss (DSM) feature. The DSM feature is configured at the secure ports by a combination of the values of the notifying and secure bits. In an embodiment of the invention, the feature is configured only on the secure ports in the network. Details related to the DSM feature at the secure ports are stored in a Logical Interface (LIF) database. The database allows specific properties to be set at all the secure ports. When a secure or non-secure data frame from a new source port is received on these ports, source identifier 310 is unable to find an entry corresponding to the network address of the new source port. Thereafter, secure-bit identifier 310 sets the value of the notifying bit to '0' and the secure-bit to '0'.

The data frame is then directed to dropping module 402, where it is dropped. Further, updating module 410 receives the data frame, determines whether it is a secure data frame and updates the forwarding table if the data frame is secure so that the network address of the source of data frame is identified as secure next time. This allows other data frames from the new source port on this flow to be forwarded and not dropped. If this is a non-secure data frame, updating module 410 will not update the forwarding table and the value of the notifying bit is set to '1'.

In an embodiment of the invention, secure-bit identifier 310 and notifying-bit identifier 406 are bit-level filters. On the application of filters to the forwarding table entry, these filters extract the value of the secure-bit and the notifying-bit, respectively. Updating module 410 includes a driver for configuring the CAM. The driver is capable of changing the forwarding table entries stored in the CAM.

In an embodiment of the invention, the driver is an L2 software driver for configuring the CAM. Further, the CAM includes an L2 forwarding table. The L2 software driver takes input from a system administrator and configures the forwarding table stored in the CAM. In an embodiment of the invention, the system administrator provides input through a Command Line Interface (CLI). The inputs are based on the directions given by updating module 410.

Figure 5:
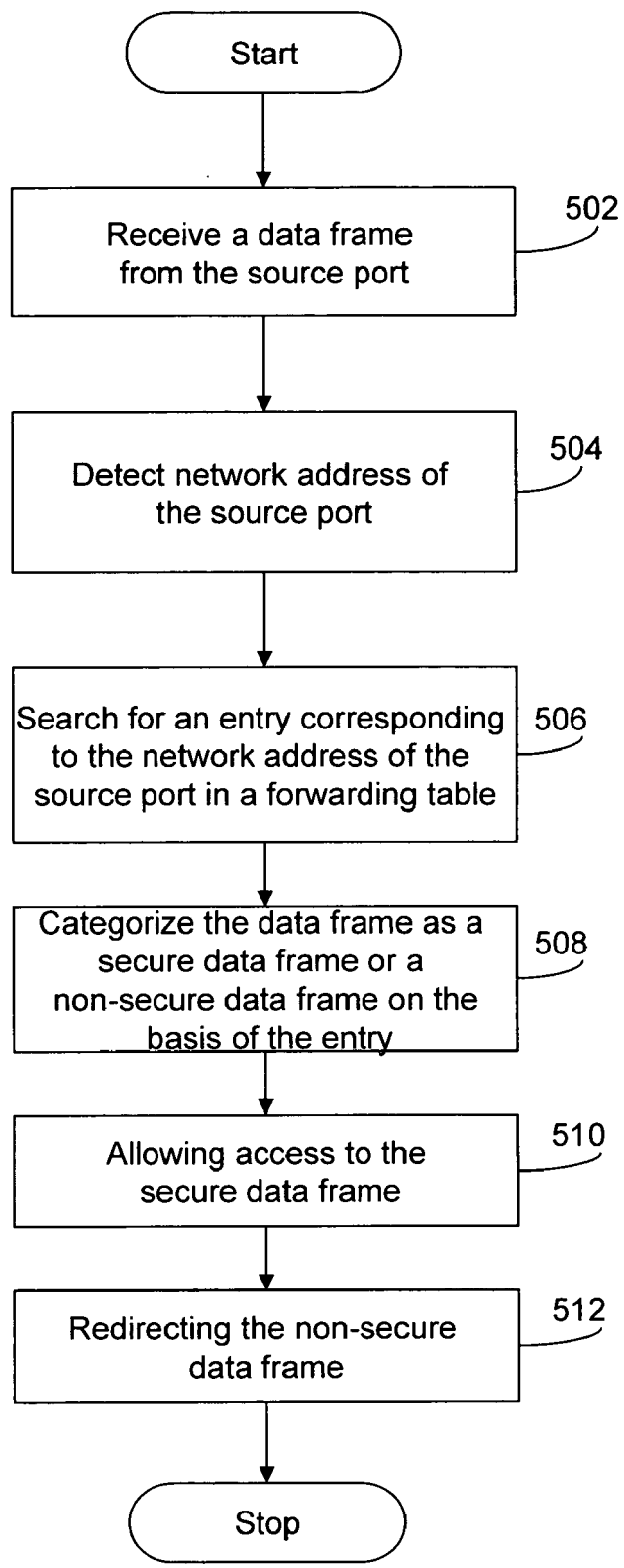
FIG. 5 is a flow diagram of a method for identifying and processing secure data frames that flow between a source port and a switch port in a network in accordance with an embodiment of the invention.

FIG. 5 is a flow diagram of a method for identifying and processing secure data frames that flow between switch port 206 and source port 216 in a network, in accordance with an embodiment of the invention. At 502, switch port 206 receives a data frame from source port 216. The data frame contains the network address of source port 216 and a destination port 218. At 504, source-detector 304 detects the network address of source port 216. At 506, the network address of source port 216 is searched for in the forwarding table. The forwarding table is stored in memory 306. The memory is a CAM. Thereafter, the entry corresponding to the network address of source port 216 is identified in the forwarding table. At 508, secure-bit identifier 310 detects the value of secure bit in the entry. If the value of secure bit is '1', the data frame is identified as secure data frame. At 510, the secure data frame is allowed access to the network through the destination port 218 in the network. The entry whose value of secure bit is '1' is locked and cannot be changed during the process of identifying new source addresses. When the value of secure bit is identified as '0', the data frame is identified as a non-secure data frame. At 512, the non-secure data frame is directed to redirecting module 302.

Figure 6A:
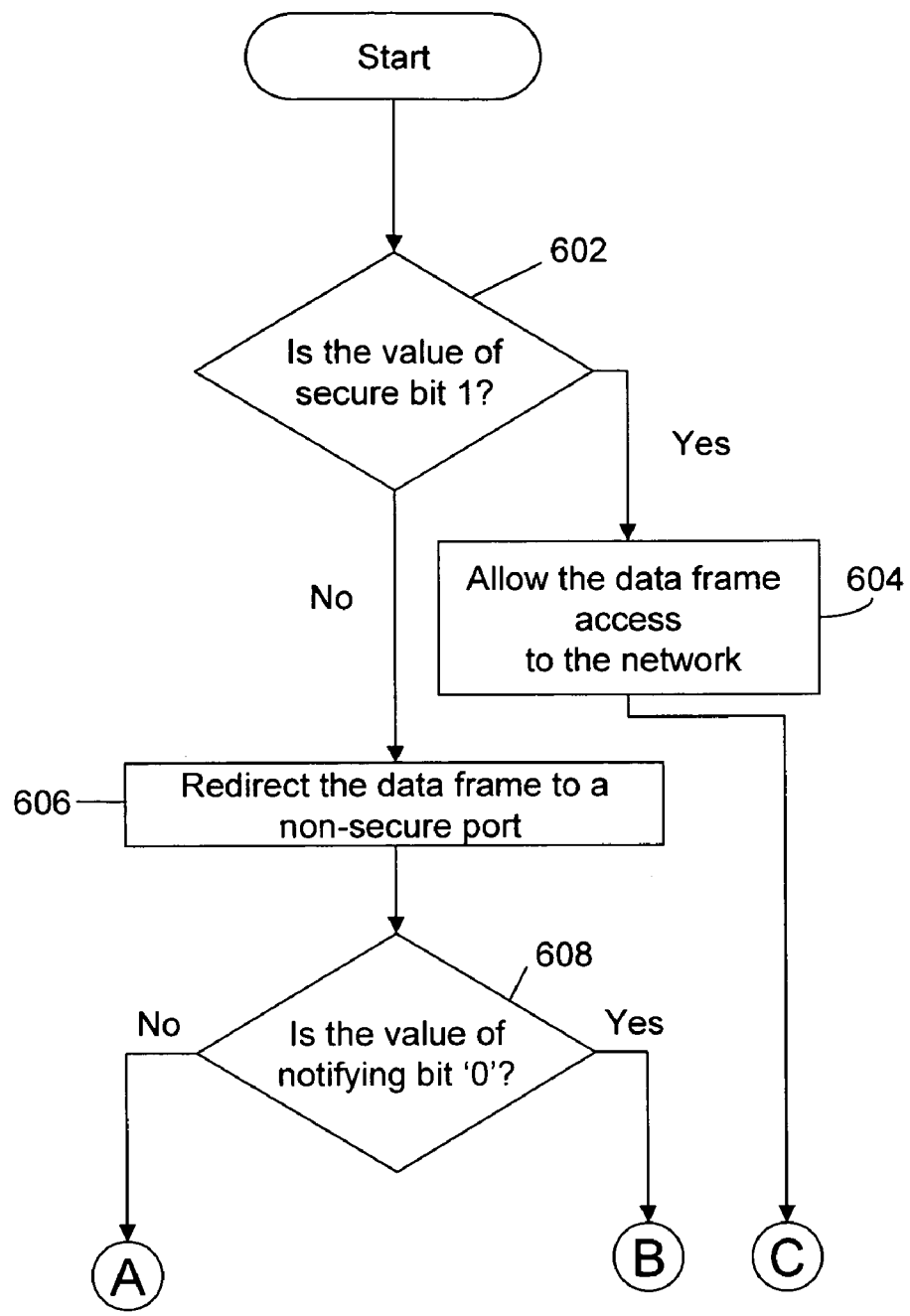
FIG. 6 is a flow diagram of a method for categorizing and processing a data frame in a network in accordance with an embodiment of the invention.
Figure 6B:
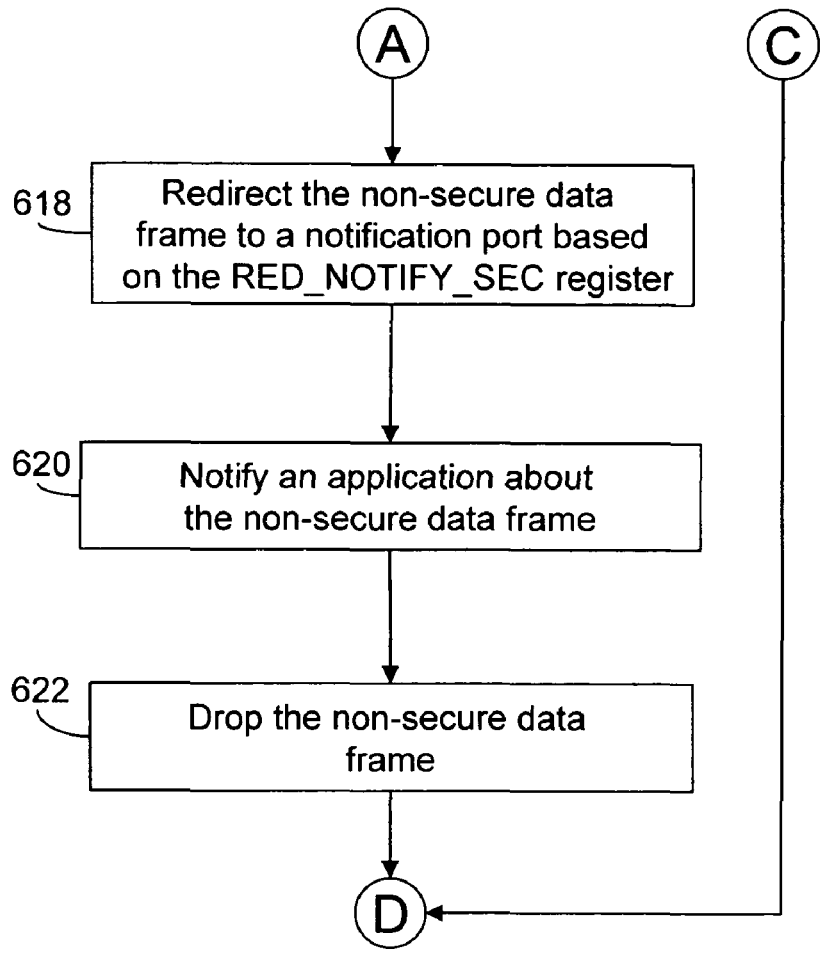
Figure 6C:
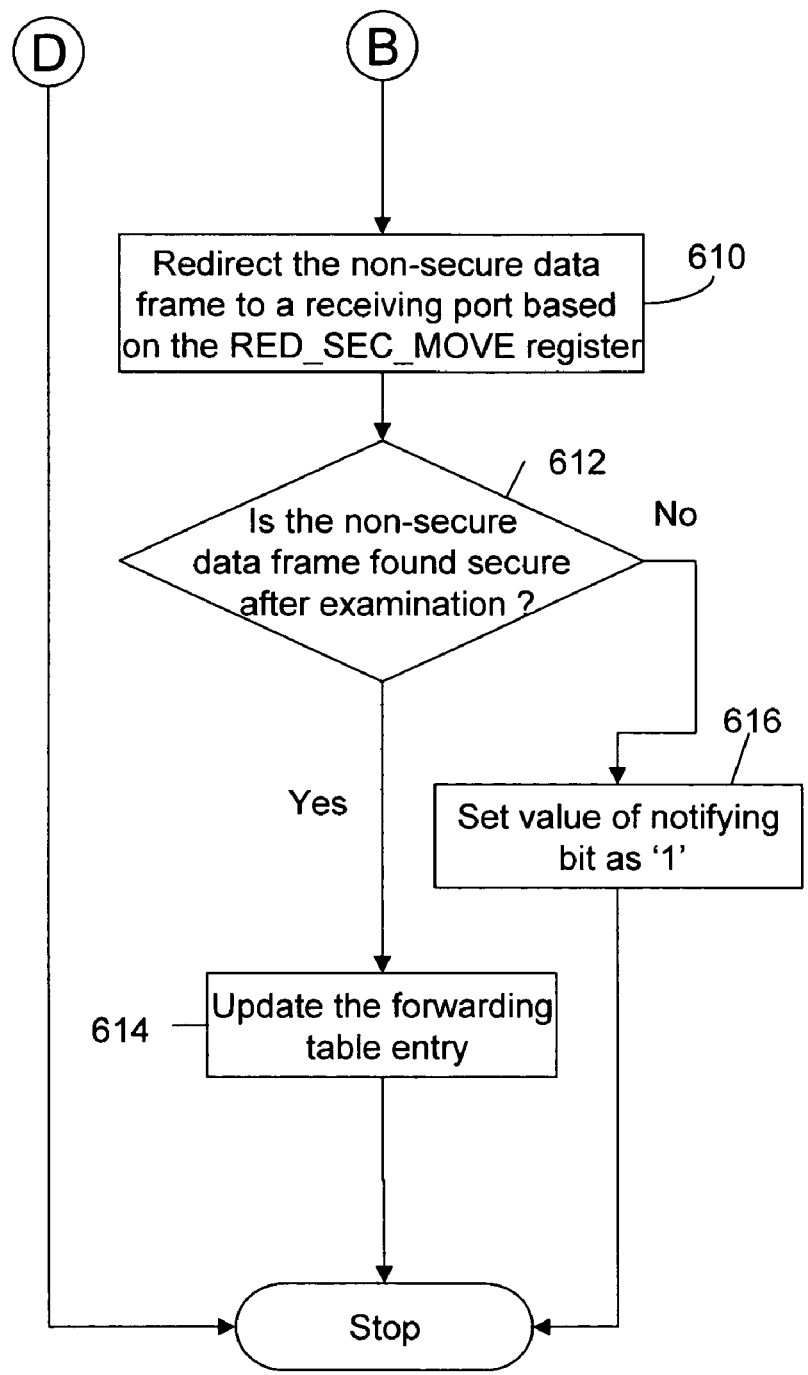

FIG. 6 is a flow diagram of a method for categorizing and processing a data frame in a network, in accordance with an embodiment of the invention. At 602, secure-bit identifier 310 detects the value of secure bit in the entry. If the value of secure bit is '1', then at 604, the data frame is categorized as a secure data frame and allowed access to the network through destination port 218.

If the value of the secure bit is identified as '0', then at 606, the data frame is categorized as a non-secure data frame and is directed to a non-secure port by redirecting module 302. At 608, notifying-bit identifier 406 checks the value of the notifying bit in the forwarding table entry. If the value of notifying bit is '0', a RED_SEC_MOVE register at redirecting module 302 directs the non-secure data frame to examining unit 404 at the receiving port, at 610. Thereafter, at 612, updating module 410 at examining unit 404 analyzes the non-secure data frame to identify if the data frame is a secure data frame. If the non-secure data frame is identified as the secure data frame, the forwarding table entry is updated at 614. Otherwise, at 616, the value of notifying bit is set to '1'.

However, if the value of notifying bit is identified as '1' at 608, a RED_NOTIFY_SEC register at redirecting module 302 directs the non-secure data frame to notification interface 408 at the notification port at 618. Thereafter, at 620, an application is notified about the non-secure data frame. At 622, the data frame is dropped at dropping module 402.

According to an embodiment of the invention, a method is provided for identifying and processing secure data frames flowing between a source port and a switch port in a network. The method comprises receiving a data frame from the source port; detecting the network address of the source port; searching for an entry corresponding to the network address of the source port in a forwarding table; categorizing the data frame as a secure data frame on the basis of the entry; allowing access to the secure data frame, and redirecting the non-secure data frame.

In another embodiment of the invention, a system is provided for identifying and processing a data frame in a network. The system comprises a switch port for receiving the data frame from a source port; a controller for categorizing the data frame as a secure data frame and a non-secure data frame, and a means for redirecting the non-secure data frame.

Embodiments of the invention provide a method and a system for identification of secure flow in the network. This feature makes the sharing of confidential and privileged information over the network more reliable and secure. The embodiments of the invention also prevent leaking of secure traffic to non-secure ports. Further, the embodiments prevent leaking of non-secure traffic to secure ports. There is no limitation to the number of secure ports in the network. Moreover, embodiments of the invention can be implemented at data frame level, providing reliable and robust security in the network. Embodiments of the invention also provide a method and a system to prevent spoofing of the secure hosts in the network.

In addition, embodiments of the invention provide a method and system to detect movement in network address associated with the secure hosts. When a data frame from a network address corresponding to a secure port is detected at a switch-port where the network address is not learnt, the frame is redirected to another port using the RED_SEC_MOVE register as the value of notifying bit is '0'. The default value of notifying bit is '0'. Further, the data frame is examined and processed as a non-secure data frame.

Embodiments of the present invention provide a mechanism to identify secure flows in a network router. Secure flows are identified using secure bit in the L2 forwarding table entry and are in a different way compared with all other flows in the system. The processing for these secure flows is controlled by using specific control called DSM (Drop on Source Miss) in a database called LDB (LIF Database). This database allows specific properties to be set per {port, VLAN}. Associated logic is implemented in the hardware to redirect all spoofed (IDS, non-secure traffic) traffic that is supposed to be non-secure received on secure ports. This is provided using RED_SEC_MOVE register which redirects all such non-secure traffic (received on secure ports) to different index. This event is notified to security software applications or another mechanism listening for such attacks.

Embodiments of this invention implement many security features including port-security, IDS attack, and spoof-detection. At certain ports of a router only selected hosts are allowed to send traffic to the router. These ports are termed secure ports and the hosts are termed secure hosts (secure MAC addresses). On these secure ports only certain MAC addresses are allowed to be learnt so that the traffic sent out of these ports are destined to only these specific hosts. The router does not forward any traffic sent out of these ports, that is destined to any other host. When these secure MAC addresses are seen on any different ports (non-secure ports), then they should not be allowed to change the index in the forwarding table entry. This is to detect and avoid spoofing and allow the traffic destined to these secure hosts not get sent out of non-secure ports. Secure MAC addresses are tagged with secure bit in the forwarding table entries. When a MAC address move is detected on such a secured MAC entry, the frame is redirected to a special index, RED_SEC_MOVE. If notification is enabled on the same entry, then the frames are redirected to another index, RED_NOTIFY_SEC. To avoid spoofed frames getting learnt on secure hosts, DSM control is provided in the LDB table entry. Port security can be configured on ports where the port security feature is configured. When new source MAC addresses are seen on these secure ports on which DSM is configured, the frames are dropped. An L2 driver provides support to port security feature in the form of an API to configure registers to specific indices.

In yet another embodiment, the present invention provides mechanisms in router hardware to identify secure customer flows; segregate secure customer flows from other flows in the system; provide special processing to such secure traffic; isolate non-secure flows on secure ports; provide event notifications to the software about potential IDS attacks and non-secure traffic spoofing.

Although the invention has been discussed with respect to specific embodiments thereof, these embodiments are merely illustrative, and not restrictive, of the invention. For example, a 'method for identifying secure data frames flowing between a source port and a switch port in a network' can include any type of analysis, manual or automatic, to anticipate the needs of identification.

Although specific protocols have been used to describe embodiments, other embodiments can use other transmission protocols or standards. Use of the terms 'peer', 'client', and 'server' can include any type of device, operation, or other process. The invention can operate between any two processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the routines of the invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the invention, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the invention.

Also in the description herein for embodiments of the invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for presenting media via a suitable directly or indirectly coupled input/output (I/O) device, the computer would have suitable instructions for allowing a user to input or output (e.g., present) program code and/or data information respectively in accordance with the embodiments of the invention.

A 'computer readable medium' for purposes of embodiments of the invention may be any medium that can contain, store, communicate, propagate, or transport the computer program for use by or in connection with the instruction execution system apparatus, system or device. The computer readable medium can be, by way of example only but not by limitation, an electronic, magnetic, optical, electromagnetic, infrared, or semiconductor system, apparatus, system, device, propagation medium, or computer memory.

Reference throughout this specification to "one embodiment", "an embodiment", or "a specific embodiment" means that a particular feature, structure, or characteristic described in connection with the embodiment is included in at least one embodiment of the invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the invention may be combined in any suitable manner with one or more other embodiments. It is to be understood that other variations and modifications of the embodiments of the invention described and illustrated herein are possible in light of the teachings herein and are to be considered as part of the spirit and scope of the invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. The foregoing description of illustrated embodiments of the invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention.

Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for identifying and processing secure data frames flowing between a source port and a switch port in a network, the method comprising:

receiving a data frame from the source port;

detecting network address of the source port;

searching for an entry corresponding to the network address of the source port in a forwarding table;

categorizing the data frame as a secure data frame or a non-secure data frame on the basis of the entry in the forwarding table;

allowing access to the secure data frame; and redirecting the non-secure data frame by updating the value of a notifying bit using a RED_SEC_MOVE register, redirecting the non-secure-data frame to a receiving port or a notification port based on the value of the notifying bit;

examining the non-secure data frame at the receiving port, updating the forwarding table if the examined non-secure data frame is found to be a secure data frame; and dropping the non-secure data frame if the examined non-secure data frame is found to be a non-secure data frame.

2. The method of claim 1, wherein the network address is the Medium Access Control (MAC) address.

3. The method of claim 1, wherein the network address is the Virtual Local Area Network (VLAN) address.

4. The method of claim 1, wherein the forwarding table is stored in a Content Addressable Memory (CAM).

5. The method of claim 1, wherein the entry comprises a secure bit.

6. The method of claim 1 further comprises means to disable change in the entry in the forwarding table.

7. The method of claim 1 further comprises enabling a Drop on Source Miss (DSM) feature at secure ports in the network.

8. The method of claim 7, wherein the details related to the DSM feature at the secure ports is stored in a Logical Interface (LIF) database.

9. The method of claim 1, wherein redirecting the non-secure data frame further comprises notifying an application based on the entry in the forwarding table.

10. The method of claim 9, wherein the entry comprises a notifying bit.

11. A system for processing a data frame in a network, the system comprising:
a switch port for receiving the data frame from a source port; and
a controller for categorizing the data frame into a secure data frame and a non-secure-data frame;
a receiving port;
a redirecting module having a RED_SEC_MOVE register to update a value of a notifying bit to redirect the non-secure-data frame to one of a notification port and receiving portion n response to a notifying bit having a predetermined value.

12. The system of claim 11, wherein the controller comprises:
a source-detector adapted for detecting a network address of the source port;
a memory that includes a forwarding table;
a memory controller adapted for searching the forwarding table for an entry, the entry corresponding to the network address of the source port; and
a secure bit identifier that detects a secure bit in the entry.

13. The system of claim 11 further comprises a port controller, the port controller enabling a DSM feature at the secure ports.

14. The system of claim 13, wherein the redirecting module further comprises:
means for dropping the non-secure data frame based on a predefined condition;
a notifying bit identifier for detecting a notifying bit in the entry;
a notification interface for notifying an application about non-secure data frames; and means for examining the non-secure data frame.

15. The system of claim 14, wherein the means for examining the non-secure data frame comprises means for updating the forwarding table.

16. A method for identifying and processing secure data frames flowing between a source port and a switch port in a network, the method comprising:
receiving a data frame from the source port;
detecting network address of the source port;
searching for an entry corresponding to the network address of the source port in a forwarding table;
categorizing the data frame as a secure data frame or a non-secure data frame on the basis of the entry in the forwarding table;
allowing access to the secure data frame;
updating the value of a notifying bit using a RED_SEC_MOVE register; and
redirecting the non-secure-data frame to one of a receiving port and a notification port based on the value of the notifying bit.

17. The method of claim 16, wherein redirecting the non-secure data frame further comprises notifying an application based on a notifying bit in the forwarding table.

18. The method of claim 17 further including examining the non-secure data frame at the receiving port and updating the forwarding table if the examined non-secure data frame is found to be a secure data frame; and dropping the non-secure data frame if the examined non-secure data frame is found to be a non-secure data frame.

19. The method of claim 18 wherein the network address is selected from a set of addresses consisting essentially of a Medium Access Control (MAC) address and a Virtual Local Area Network (VLAN).

* * * * *